United States Patent
Tanioka et al.

(10) Patent No.: US 6,946,204 B2
(45) Date of Patent: Sep. 20, 2005

(54) PAPER/FILM COMPOSITE STRUCTURE AND MAKING METHOD

(75) Inventors: Soji Tanioka, Tokyo (JP); Sakae Obara, Tokyo (JP); Kazuhisa Hayakawa, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 20 days.

(21) Appl. No.: 10/752,715

(22) Filed: Jan. 8, 2004

(65) Prior Publication Data

US 2004/0137253 A1 Jul. 15, 2004

(30) Foreign Application Priority Data

Jan. 10, 2003 (JP) ........................................ 2003-003942

(51) Int. Cl.[7] .............................................. B32B 23/00
(52) U.S. Cl. .................... 428/537.5; 428/535; 428/536; 156/325
(58) Field of Search ............................. 428/537.5, 535, 428/536; 156/325

(56) References Cited

U.S. PATENT DOCUMENTS

| 4,366,227 A | * | 12/1982 | Berger et al. ............... 430/215 |
| 5,039,341 A | * | 8/1991 | Meyer ..................... 106/194.2 |
| 5,166,332 A | | 11/1992 | Breckwoldt |
| 5,762,846 A | * | 6/1998 | Blankenbeckler et al. .. 264/127 |
| 6,380,381 B1 | * | 4/2002 | Obara ......................... 536/84 |
| 6,514,609 B1 | * | 2/2003 | Siggel et al. ................ 428/372 |
| 6,525,192 B2 | * | 2/2003 | Obara et al. .................. 536/85 |
| 6,680,069 B1 | * | 1/2004 | Obara ......................... 424/451 |
| 6,680,116 B2 | * | 1/2004 | Siggel et al. ................ 428/370 |
| 6,686,464 B1 | * | 2/2004 | Harding et al. ............... 536/84 |

FOREIGN PATENT DOCUMENTS

| JP | 10-324053 A | 12/1998 |
| JP | 11-227323 A | 8/1999 |
| JP | 2000-95993 A | 4/2000 |
| JP | 2001-253015 A | 9/2001 |
| JP | 1 342 733 A1 | 10/2003 |

* cited by examiner

*Primary Examiner*—Ieszek Kiliman
(74) *Attorney, Agent, or Firm*—Birch, Stewart, Kolasch & Birch, LLP

(57) ABSTRACT

In a paper/film composite structure, the film is made of a low substituted cellulose ether having a molar degree of substitution with alkyl and/or hydroxyalkyl groups in the range of 0.05 to 1.3. The paper/film composite structure can be delivered to the waste paper recycling process without previously removing the film portion. The strength of film is increased without adding to the manufacturing cost. The paper/film composite structure is inexpensive and eliminates the risk of film rupture during the working, transporting and use stages.

9 Claims, No Drawings

US 6,946,204 B2

PAPER/FILM COMPOSITE STRUCTURE AND MAKING METHOD

This Nonprovisional application claims priority under 35 U.S.C. §119(a) on Patent Application No. 2003-003942 filed in JAPAN on Jan. 10, 2003 the entire contents of which are hereby incorporated by reference.

BACKGROUND OF THE INVENTION

1. Field of the Invention

This invention relates to paper/film composite structures which can be recycled for paper reuse without previously removing film portions.

2. Background Art

Nowadays, many companies, municipalities and community units make efforts to recover a number of waste paper items including old news papers, magazines and corrugated fiberboard. Recovered waste paper items are transported to a recycle plant where they are processed and recycled for reuse. However, problems arise in recycling paper/film composite structures including windowed envelopes, wrapping materials provided with film portions through which the commodity inside is seen, and laminated paper items (e.g., dishes and cups) having a film laminated for imparting water resistance. This is because film portions are not removed during the waste paper processing and thus left in recycled paper to deteriorate its quality. Even when a filter is provided in the recycling process for removing the film, the filter is frequently clogged, which substantially lowers the efficiency of the recycling process. Thus, the waste paper recycle process is inoperative unless film portions are previously removed.

In fact, it is very cumbersome for each household or company to manually remove only film portions from waste composite structure items and put out only paper portions for recovery. Under the circumstances, such composite structure items are discarded as combustible waste or landfill.

To remedy the incompatibility of paper/film composite structure items with the waste paper recycling process, JP-A 2001-253015 discloses the use of water-insoluble, alkali-soluble cellulose derivatives such as dicarboxylic acid esters of hydroxyalkyl alkyl celluloses and cellulose acetate phthalate to form films.

This method has the benefit that film portions are removed during alkali treatment in the waste paper recycling process because the film is alkali soluble, eliminating a need to previously remove film portions. However, the following problem must be solved before this method can be commercially practiced. Films made of alkali soluble cellulose derivatives can be damaged during their working, transporting and service stages because of their low mechanical strength. The problem might be solved by using an alkali-soluble cellulose derivative having a high degree of polymerization or by increasing the film thickness to enhance the film strength. These approaches, however, undesirably increase the cost of film and are thus commercially unacceptable.

SUMMARY OF THE INVENTION

An object of the invention is to provide an inexpensive paper/film composite structure which includes a film portion having high strength and can be delivered to the waste paper recycling process without previously removing the film portion, and a method for preparing the same.

It has been found that a film made of a cellulose ether which is substituted with alkyl and/or hydroxyalkyl groups to a molar degree of substitution in the range of 0.05 to 1.3 has a high strength, and a composite structure having the film combined with paper is inexpensive and can be delivered to the waste paper recycling process without previously removing the film.

The present invention provides a paper/film composite structure comprising paper and film combined together, wherein the film is made of a low substituted cellulose ether having a molar degree of substitution with alkyl and/or hydroxyalkyl groups in the range of 0.05 to 1.3.

In another aspect of the invention, the paper/film composite structure is prepared by dissolving the low substituted cellulose ether in an aqueous alkali solution; contacting the solution with an acidic aqueous solution for coagulating the cellulose ether to form a film; and joining the film to paper.

DESCRIPTION OF THE PREFERRED EMBODIMENTS

In the paper/film composite structure of the invention, the film is made of a low substituted cellulose ether. The "low substituted cellulose ether" used herein means that the hydrogen atoms of hydroxyl groups on glucose rings constituting cellulose are substituted with alkyl and/or hydroxyalkyl groups to a molar degree of substitution of 0.05 to 1.3, preferably 0.1 to 1.1. The low substituted cellulose ether is insoluble in water, but soluble in aqueous alkaline solution. If the molar degree of substitution is less than 0.05, the cellulose ether becomes less soluble in aqueous alkaline solution so that it impedes film formation and is not readily removed during the alkali treatment in the waste paper recycling process. If the molar degree of substitution is more than 1.3, the cellulose ether becomes well soluble in water so that the film thereof is less resistant to water and the function of paper/film composite structure is lost.

Examples of the low substituted cellulose ether include low substituted alkyl celluloses such as low substituted methyl cellulose and low substituted ethyl cellulose; low substituted hydroxyalkyl celluloses such as low substituted hydroxyethyl cellulose and low substituted hydroxypropyl cellulose; and low substituted hydroxyalkyl alkyl celluloses such as low substituted hydroxypropyl methyl cellulose and low substituted hydroxyethyl methyl cellulose.

It is not critical how to form the low substituted cellulose ether into a film. However, a typical method of forming a film by dissolving a low substituted cellulose ether in an aqueous alkali solution and contacting the solution with an acidic aqueous solution for coagulation is preferred for the thickness uniformity, planarity and cost of film. To enhance the efficiency of coagulation, an inorganic salt such as sodium sulfate or potassium sulfate may be added to the acidic aqueous solution. Specifically, like the cellophane film-forming technology, a low substituted cellulose ether solution is extruded from a casting hopper into acidic water where the cellulose ether is coagulated. The film may then be washed with water and dried if the salt of neutralization as the impurity must be removed.

Suitable aqueous alkaline solutions used herein include aqueous solutions of sodium hydroxide and potassium hydroxide. The alkali concentration may be determined as appropriate since it varies with the type and degree of substitution of substituent groups on the low substituted cellulose ether. Usually, the alkali concentration is 1 to 25% by weight, preferably 2 to 15% by weight. With an alkali concentration of less than 1 wt %, the low substituted cellulose ether may not be dissolved. With an alkali concentration of more than 25 wt %, the low substituted cellulose ether solution may become gel-like, interfering with subsequent film formation. In a typical example, a low substituted hydroxypropyl cellulose having a molar degree of substitution of 0.2 is dissolved in an aqueous sodium hydroxide solution having a concentration of 10 wt %.

On the other hand, the concentration of low substituted cellulose ether in the aqueous alkaline solution is preferably 0.5 to 15% by weight, more preferably 1 to 10% by weight.

Suitable acids used herein include mineral acids such as hydrochloric acid and sulfuric acid and organic acids such as citric acid, malic acid and acetic acid. The acid concentration of the acidic aqueous solution is preferably 1 to 20% by weight, especially 2 to 15% by weight.

If desired, the film can be made more flexible by previously adding a softener such as glycerin or triethylene glycol to the aqueous alkali solution or by impregnating a gel-like film prior to drying or a film after drying with such a softener.

No particular limits are imposed on the paper used in the paper/film composite structure of the invention. Included are a variety of information paper sheets for printing, recording and writing purposes, coated paper sheets, paper boards, business paper sheets, wrapping papers, and paper items such as paper containers, exterior boxes and paper bags.

In combining the film with paper to form a composite structure, they may be joined together by bonding techniques, for example, using adhesives such as polyvinyl alcohol and starch glue. Alternatively, the film is joined to paper under heat and pressure.

The paper/film composite structure may take any desired shape. Exemplary shapes of composite structure include windowed envelopes, wrapping containers provided with a film portion through which the commodity inside is seen, and laminated paper items (e.g., dishes and cups) having a film laminated to paper.

water and dried to give a film of low substituted cellulose ether having a thickness of 30 μm.

TABLE 1

| Film-Forming Example | Material | Molar degree of substitution | |
|---|---|---|---|
| | | Methyl | Hydroxypropyl |
| 1 | low substituted hydroxypropyl cellulose | | 0.18 |
| 2 | | | 0.26 |
| 3 | | | 0.35 |
| 4 | | | 1.1 |
| 5 | low substituted hydroxypropyl methyl cellulose | 0.44 | 0.44 |
| 6 | low substituted methyl cellulose | 0.81 | |

Film-Forming Examples 7–10

Each of alkali-soluble cellulose derivatives shown in Table 2 (made by Shin-Etsu Chemical Co., Ltd.) was dissolved in a 7/3 (weight ratio) mixture of methylene chloride and methanol to form a casting solution having a concentration of 10 wt %. The solution was cast on a glass plate and dried into a film of 30 μm thick.

TABLE 2

| Film-Forming Example | Trade name | Material | Molar degree of substitution | | | | |
|---|---|---|---|---|---|---|---|
| | | | Meo | Hpo | CB | Ac | HHP |
| 7 | HP-55 | hydroxypropyl methyl cellulose phthalate | 1.9 | 0.25 | 0.65 | | |
| 8 | HP-50 | | | | 0.4 | | |
| 9 | HPMCAP | hydroxypropyl methyl cellulose acetate phthalate | 1.4 | 0.2 | 0.6 | 0.6 | |
| 10 | HPMCHHP | hydroxypropyl methyl cellulose hexahydrophthalate | 1.9 | 0.25 | | | 0.8 |

Meo: methoxyl,
Hpo: hydroxypropoxyl,
CB: carboxybenzoyl,
Ac: acetyl,
HHP: hexahydrophthalyl

EXAMPLE

Examples of the invention are given below by way of illustration and not by way of limitation.

Film-Forming Examples 1–6

A solution was prepared by dissolving 9 parts by weight of a low substituted cellulose ether as shown in Table 1 in 91 parts by weight of a 10 wt % aqueous solution of sodium hydroxide and cast on a glass plate. The coating on the glass plate was placed in a 5 wt % dilute hydrochloric acid for coagulation, forming a gel-like film. It was washed with Film Test The films obtained in Film-Forming Examples 1 to 10, designated Films 1 to 10, were measured for impact strength. The results are shown in Table 3.

[Impact Strength Test]

Instrument: Dupont drop-weight tester

Specimen: A film piece of 30 mm×30 mm×0.025 mm was allowed to stand in a desiccator at a temperature of 25° C. and a relative humidity of 57% for 48 hours.

A weight of 300 g was dropped from a varying height onto the specimen. The minimum height (mm) above which the specimen was broken was reported as the impact strength.

TABLE 3

| Test No. | Film | Impact strength (mm) |
| --- | --- | --- |
| 1 | Film 1 | 70 |
| 2 | Film 2 | 60 |
| 3 | Film 3 | 75 |
| 4 | Film 4 | 60 |
| 5 | Film 5 | 55 |
| 6 | Film 6 | 65 |
| 7 | Film 7 | 15 |
| 8 | Film 8 | 15 |
| 9 | Film 9 | 20 |
| 10 | Film 10 | 15 |

Examples 1–6 and Comparative Examples 1–4

Using Films 1 to 10, windowed envelopes were prepared. The envelope size was 120×235 mm, the window size was 45×80 mm, and the film piece size was 55×90 mm. The windowed envelopes were subjected to a mailing test and a waste paper recycling model test. The results are shown in Table 4.

[Mailing Test]

For each film, ten windowed envelopes were prepared. Stamps were put on the envelopes with the sender's address, which were mailed in a normal course. After the envelopes were delivered back to the sender, the number of envelopes whose film portion was ruptured was counted.

[Waste Paper Recycling Model Test]

The windowed envelopes were immersed in an aqueous solution containing 2 wt % sodium hydroxide and 0.5 wt % polyethylene nonyl phenyl ether at 70° C. The solution was agitated for 5 minutes, after which it was passed through a mesh filter having an opening of 1 cm. The filtration state was observed.

TABLE 4

|  | Film | Mailing test | Waste paper recycling model test |
| --- | --- | --- | --- |
| Example 1 | Film 1 | 0 | passed without residues |
| Example 2 | Film 2 | 0 | passed without residues |
| Example 3 | Film 3 | 0 | passed without residues |
| Example 4 | Film 4 | 0 | passed without residues |
| Example 5 | Film 5 | 0 | passed without residues |
| Example 6 | Film 6 | 0 | passed without residues |
| Comparative Example 1 | Film 7 | 8 | passed without residues |
| Comparative Example 2 | Film 8 | 7 | passed without residues |
| Comparative Example 3 | Film 9 | 6 | passed without residues |
| Comparative Example 4 | Film 10 | 8 | passed without residues |

There has been described a paper/film composite structure including a film portion having high strength. It can be delivered to the waste paper recycling process without previously removing the film portion. The strength of film is increased without adding to the manufacturing cost. Thus the paper/film composite structure is inexpensive and eliminates the risk of film rupture during the working, transporting and use stages.

Japanese Patent Application No. 2003-003942 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A paper/film composite structure comprising paper and film combined together, the film being made of a low substituted cellulose ether having a molar degree of substitution with alkyl and/or hydroxyalkyl groups in the range of 0.05 to 1.3.

2. The composite structure of claim 1 wherein the low substituted cellulose ether is selected from the group consisting of low substituted alkyl celluloses, low substituted hydroxyalkyl celluloses, and low substituted hydroxyalkyl alkyl celluloses.

3. A method for preparing the paper/film composite structure of claim 1, comprising the steps of:

dissolving the low substituted cellulose ether in an aqueous alkali solution, contacting the solution with an acidic aqueous solution for coagulating the cellulose ether to form a film, and joining the film to paper.

4. The method of claim 3 wherein the aqueous alkali solution has an alkali concentration of 1 to 25% by weight.

5. The method of claim 3 wherein the concentration of low substituted cellulose ether in the aqueous alkaline solution is 0.5 to 15% by weight.

6. The method of claim 3 wherein the acidic aqueous solution contains a mineral acid or organic acid.

7. The method of claim 6 wherein the acid concentration of the acidic aqueous solution is 1 to 20% by weight.

8. The method of claim 3 wherein the joining step uses an adhesive.

9. The method of claim 3 wherein the joining step includes bonding under heat and pressure.

\* \* \* \* \*